Oct. 13, 1959    R. E. KIRKLAND    2,908,888
ACOUSTIC LOGS
Filed March 16, 1956
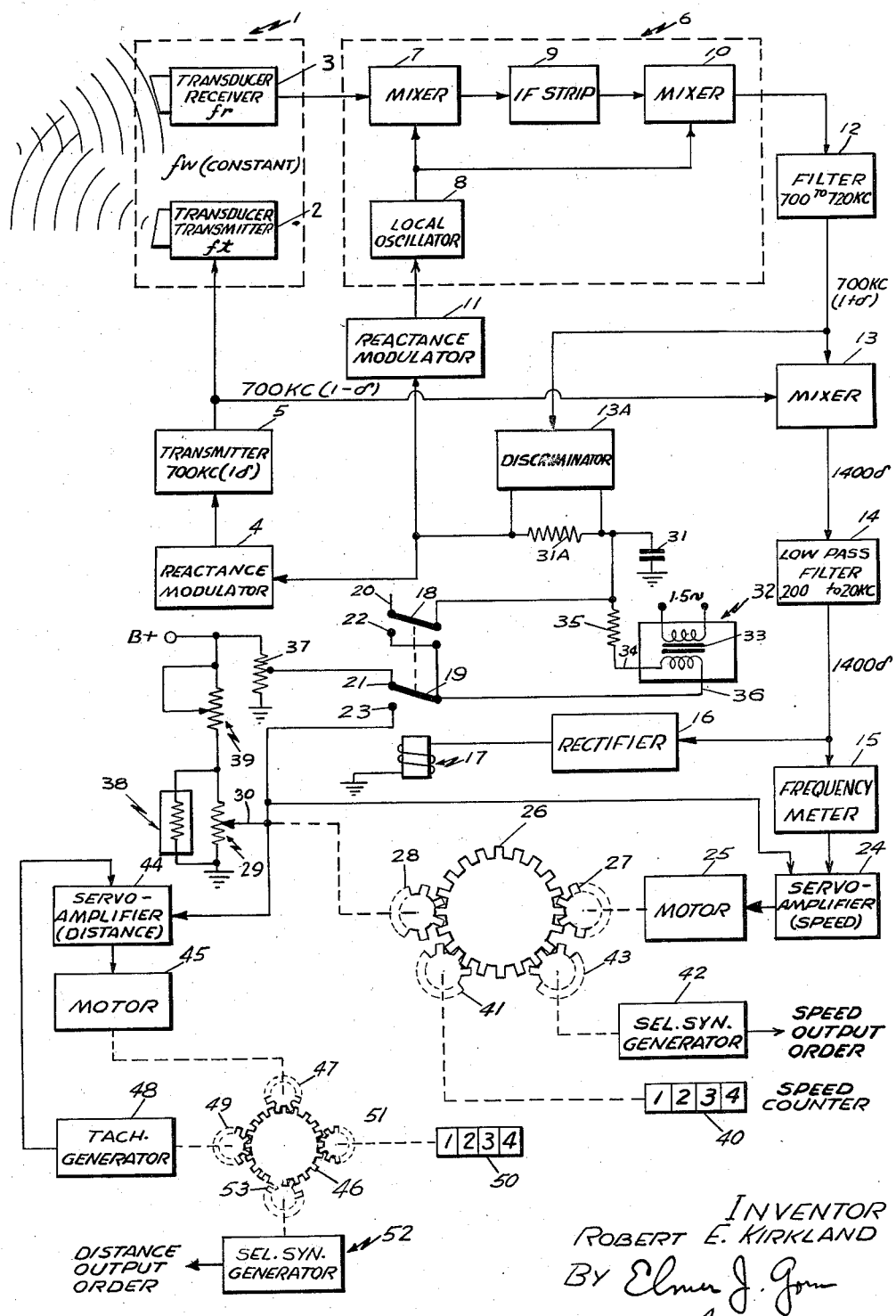
INVENTOR
ROBERT E. KIRKLAND
BY Elmer J. Gorn
ATTORNEY

2,908,888

ACOUSTIC LOGS

Robert E. Kirkland, Belmont, Mass., assignor to Raytheon Company, a corporation of Delaware Application March 16, 1956, Serial No. 572,036

4 Claims. (Cl. 340—3)

This is a continuation-in-part of a corresponding application, Serial No. 458,839, filed September 28, 1954, and now abandoned.

This invention relates to a velocity-determining apparatus, and more particularly, to an acoustic log system whereby the difference or Doppler frequency between the transmitted and received energy waves may be determined.

This invention discloses a particular system whereby transmitted and received frequencies may be accurately compared to determine the frequency difference. It is known that the velocity of a ship traveling through the water may be determined by transmitting sonic frequency energy from the ship through the water in a direction parallel to the direction of the motion of the ship, and receiving sonic frequencies which are reflected back from discontinuities in the water, such as air bubbles, impurities, and surface conditions, and comparing the frequency of the received energy with the frequency of the transmitted energy. The difference frequency, sometimes called the Doppler frequency, will vary with the velocity of the ship and, therefore, the velocity of the ship may be measured in terms of this frequency. It is the purpose of the system to accurately determine and measure the difference frequency and to use the difference frequency, which is a measure of ship speed, to change the transmitted frequency, thereby creating a self-balancing closed loop servo system.

The formula for Doppler frequencies when worked out for a constant radiated frequency system and also for a constant received frequency system shows that there is a non-linearity between the ship's speed indicating signal and the actual ship speed. This non-linearity is caused by the fact that in the aforementioned systems, the frequency in the medium varies in a complex manner with the speed of the ship in the medium. In accordance with the present invention it has been determined that, if the frequency in the water is kept constant, the problem of compensating for a non-linear change is simplified.

The object of this invention, therefore, is to keep the frequency in the medium constant. This is possible since a transducer moving through the water has three frequencies which can be identified, $f_t$ which is supplied to the transducer for transmission, $f_w$ which is the frequency observed by the transducer which has no motion relative to the water, hereinafter called the medium frequency, and $f_r$ which the moving transducer receives. On transmission, the wavelength in the water is shortened because the same number of cycles which would occupy $c$ feet of length at zero speed now occupy $c-v$ feet at $v$ feet per second speed where $c$ is the velocity of sound in water and $v$ is the velocity of the ship. The wavelength is therefore shortened to the fractional value $$\frac{c-v}{c}$$

and the frequency increased by the reciprocal.

It can be shown that the following relationships must exist for the frequency in the medium to be kept constant:

$$f_t = f_w\left(1 - \frac{v}{c}\right) \quad (1)$$

and $$f_r = f_w\left(1 + \frac{v}{c}\right) \quad (2)$$

The Doppler beat frequency, which is representative of ship's speed, is the difference between the transmitted frequency $f_t$ and the received frequency $f_r$ and is represented as follows:

$$F_d = f_r - f_t \quad (3)$$

A comparison of Equations 1 and 2 shows that, if the frequency of the medium is maintained constant, the received frequency will be higher than the medium frequency by exactly the same amount that the transmitted frequency is lower from the medium frequency.

Further objects and advantages of this invention will be apparent as the description progresses, reference being made to the accompanying drawing wherein the single figure is a block diagram of the embodiment of the invention. Referring now to the drawing, there is shown a block diagram illustrating an embodiment of the invention in the form of a complete self-balancing acoustic log. A dual head section 1 containing a transmitting transducer 2 and a receiving transducer 3 is located in the bow of the ship in such a manner that the transmitting transducer 2 will focus a beam of sound at a point approximately 10 feet ahead of the ship. The receiving transducer 3 having the same focus as the transmitting transducer 2 will pick up the received signal from this point of focus. Both the transmitting transducer 2 and the receiving transducer 3 are located in the water.

By assuming a speed of sound in water of 4730 feet per second and by transmitting a sound beam that will vary in frequency with the ship's speed, it has been determined that by using a carrier frequency of 700 kilocycles, it is necessary to lower the transmitted signal frequency 250 cycles from the carrier of 700 kilocycles for each knot of ship's speed. The actual fraction that the transmitting frequency is changed is called $\delta$ and depends on the ship's speed and the velocity of sound in water. It is defined by the following mathematical explanation:

$$\delta = \frac{v}{c} \quad (4)$$

Where:

$\delta$ is the frequency-changing ratio from no Doppler to full Doppler;
$v$ is the velocity of the ship in water; and
$c$ is the velocity of sound in the water.

It can be seen that $\delta$ is a varying fractional change that depends on the ship's speed. A component of the ship speed frequency signal is fed into reactance modulator 4 which, in turn, is connected to transmitter 5 for the purpose of varying the transmitted frequency from the carrier frequency of 700 kilocycles to 700 kc. $(1-\delta)$. Since transmitter 5 drives the transmitting transducer 2, there will be propagated in the water a frequency of 700 kc. The receiving transducer 3, which is also located in the water, receives the frequencies that are reflected from the transmitted energy that is emitted by the transmitting transducer 2.

The output of receiving transducer 3 is fed directly into a superheterodyne receiver 6 having a mixer 7, local oscillator 8, I.F. strip 9, and a mixer 10. The received frequency as shown by Equation 2 will be increased by the same amount that the transmitted frequency is lowered, which means that the received frequency will be of the magnitude 700 kc. (1+δ). In order for the superheterodyne receiver 6 to track these increasing frequencies, a reactance modulator 11 is used to change the frequency of the local oscillator 8, thereby, insuring a fixed frequency in the I.F. strip 9. The reactance modulator 11 is fed by the same component of ship's speed signal that is used to drive reactance modulator 4 that is used to lower the transmitted frequency. It is obvious, therefore, that a change in ship's speed signal used to drive both reactance modulators 4 and 11 will result in a lowered transmitted frequency and a raising of the local oscillator frequency by the same amount. With this system it is possible to obtain a high degree of selectivity from the superheterodyne receiver 6 and also simplify the tracking problem.

The output of superheterodyne receiver 6 is fed directly into a filter 12 for filtering out the high frequency variations, and then into mixer 13 and discriminator 13A. Since the I.F. strip 9 has a very narrow band width of the order of 125 cycles, it is necessary to provide an additional correction to the ship's speed frequency signal for controlling both the transmitted frequency and the received frequency. This correction voltage is needed since the reactance modulator may fail to achieve the required accuracy to keep the signal within its pass band from the ship's speed signal alone. A feedback path is provided to correct such errors. It is the purpose of discriminator 13A to supply this correction voltage to reactance modulators 4 and 11 for the purpose of keeping the received frequency signal within the narrow band pass of the I.F. strip.

The output of filter 12 is mixed with a component of the transmitted frequency in mixer 13. It is the purpose of mixer 13 to obtain the difference between the received frequency and the transmitted frequency and feed it into filter 14. Since the received frequency is 10 kc. (1+δ) and the transmitted frequency is 700 kc. (1−δ), then it is obvious that the mixer 13 will deliver a frequency of 1400δ kc. to filter 14. Filter 14 is a low pass filter for keeping out frequencies higher than 1400δ kc. It is estimated that at a speed of approximately 40 knots, 1400δ kc. will be approximately 20 kilocycles so that filter 14 will have a pass range of about 200 cycles to 20 kilocycles.

The output of filter 14 is fed into a frequency meter 15 that will deliver a voltage that is proportional to the input frequency and also to a rectifier 16. Connected to the output of rectifier 16 is a relay 17 that will operate transfer arms 18 and 19. Under normal conditions, the superheterodyne receiver 6 will amplify the received signal, which in turn will energize relay 17 thereby causing operating arms 18 and 19 to transfer from positions 20 and 21 to positions 22 and 23. The output of frequency meter 15 is fed into a servo-amplifier 24, which in turn drives a reversible servo-motor 25. Motor 25 is mechanically coupled to and drives gear train 26 by means of gear 27. Motor 25 drives the gear train 26 to a position depending on the magnitude of the voltage output of frequency meter 15. When this condition is reached, gear train 26 will indicate the ship's speed. In order to provide a system that is automatic in that the gear train 26 will stop at the correct indicated ship's speed, a gear 28 is mechanically coupled to gear train 26 and the output of this gear is used to drive a potentiometer 29. Therefore, as the gear train 26 is operated by motor 25, the operating arm 30 of potentiometer 29 will be moved to a different position, thereby producing a different voltage across the operating arm 30. This voltage is fed back to servo-amplifier 24 and is balanced against the output voltage of the frequency meter 15. The action of the motor 25 is to drive the gear train 26 until the voltage fed back from potentiometer 29 is exactly equal and opposite to the voltage output of the frequency meter 15, at which point the motor will stop. It is obvious, therefore, that the system will be a self-balancing servo-loop.

As mentioned previously, both reactance modulators 4 and 11 obtain their correcting voltage from the ship's speed indicating signal, which is represented by the voltage across the potentiometer operating arm 30. Under normal operating conditions with the superheterodyne receiver 6 putting out a strong signal and the rectifier 16 energizing relay 17, the feedback path of the ship's speed frequency signal will be from operating arm 30 to position 23 through operating arm 19 to position 22, through operating arm 18 to capacitor 31 and then to reactance modulators 4 and 11 and resistance 31A where it is combined with the voltage from discriminator 13. If for any reason the system should lose the received signal causing the local oscillator 8 to lose the prevailing ship's speed frequency signal, a 1.5-cycle search frequency is inserted for bringing both the transmitted and received frequency signals back in line. This is accomplished by having a 1.5-cycle source feeding a sweep generator 32 consisting of a transformer 33. The output of the sweep generator 32 is fed to reactance modulators 4 and 11 by wire 34 through current limiting resistor 35 to the same point that the ship's speed frequency signal is fed back to. The other output of transformer 33 goes by wire 36 to operating arm 19. Therefore, if the received frequency signal is lost, there will be no output signal from the superheterodyne receiver 6, which means that relay 17 will not be operated but will remain in its non-operating position which is the indicated position in the accompanying drawing. In this condition the 1.5-cycle A.C. voltage from transformer 33 will sweep both reactance modulators 4 and 11. Thus the frequency of both transmitter and receiver will be swept back and forth over the range of Doppler frequencies at a 1.5-cycle rate. For the sweep or searching operation, operating arm 19 will transfer from position 23, which allows the ship's speed frequency signal to pass to position 21 that supplies a voltage determined by resistor 37. Since the ship's speed signal will be in error if the received signal is lost, a voltage is chosen by resistor 37 that will place the sweep frequency midway between the indicating extremes of the log system. This procedure will allow for a quick return from sweep to lock-in condition.

The search operation will continue until the superheterodyne receiver 6 is energized. As soon as this occurs, the discriminator will be energized, thereby putting out a voltage in opposition to the sweep which will limit further changes of the frequency to within the limits of the pass band of the I.F. strip 9. The discriminator will put out a D.C. component suitable to charge capacitor 31 and also to make the correction for the difference in shift desired and that called for by the inserted search plus D.C. component from position 21. Energization of the suphetereodyne receiver 6 will also cause rectifier 16 to energize relay 17, thereby transferring operating arms 18 and 19 from positions 20 and 21 to positions 22 and 23. This act will remove the search sweep for locked in conditions and also short out the output of transformer 33 through operating arm 18 and position 22 of relay 17. The circulating current of transformer 33 is limited to a safe value by current limiting resistor 35. During this transfer from sweep to lock-in conditions, capacitor 31 and will hold the proper D.C. bias for operating reactance modulators 4 and 11. The time canstants for this hold capacitor need only be greater than that for the discriminator 13 for satisfactory operation. Operating arm 19 in transferring to position 23 thereby allows the ship's speed frequency signal to again control reactance modulators 4 and 11.

It is well known that the speed of sound in water varies according to the temperature of the water, salinity, and, to a minor degree which can be neglected for our purposes, the pressure. The general formula for the speed of sound and water is as follows:

$$v = 4626 + 13.8(T) - 0.12T^2 + 3.73S \quad (11)$$

Where $v$ is the velocity of the sound in water in feet per second;
$T$ is the temperature of the water in degrees centigrade; and
$S$ is the salinity of the water measured in parts per thousand.

It has been determined that salinity varying from fresh water to that having a saline content of 40 parts per thousand by weight will cause a variation in the speed of sound in water of about 3.5% ±0.25% depending on the temperature. Variations in temperature, from −2° C. to +30° C. will cause a change of 7.3% ±0.12%, depending on salinity. These figures show that an 11% change in the speed of sound in water would be possible if traveling from the Red Sea to a fresh water lake in the Antarctic. In order to compensate for the change in temperature of the water, a temperature sensitive resistance network 38 is immersed in the water having its output connected across the terminals of potentiometer 29. Therefore, as the temperature of the water changes, the resistance of the temperature sensitive resistance member changes, thereby causing a change in the voltage across potentiometer 29. This results in different feedback voltage to appear across the operating arm 30, thereby changing the feedback voltage servoamplifier 24. This new feedback voltage being balanced against the output voltage of the frequency meter 15 will cause motor 25 to drive the gear train 26 to a new indicating position dependent on this temperature change.

The salinity factor is not made automatic, since it is not expected to vary as rapidly as that due to temperature. A potentiometer 39 is placed in series with the parallel combination of potentiometer 29 and the temperature sensitive resistance network 38. It is only necessary therefore in any fixed body of water to determine from the chart the salinity content and then manually set this reading on the manual salinity control potentiometer 39. One end of the salinity potentiometer 39 is connected to a B+ voltage and the other to the parallel combination of potentiometer 29 and the temperature sensitive network 38.

To vary the transmitted frequency over the entire Doppler range of 690 to 700 kilocycles will require a frequency variation of only 1.4% which can easily be made linear. A higher carrier frequency may be used since the log system is independent of the specific carrier frequency used.

In order to indicate speed, a speed counter 40 is mechanically coupled by gear 41 to gear train 26. For remote speed output orders, a Selsyn generator 42 is mechanically coupled to gear train 26 by means of gear 43.

To indicate distance, a second servo-amplifier 44 is connected to the operating arm 30 of potentiometer 29. This voltage at potentiometer 29 is a voltage that represents the ship's speed. The output of servo-amplifier 44 drives motor 45 which, in turn, is mechanically coupled to gear train 46 by means of gear 47. A tachometer generator 48 is mechanically coupled to gear train 46 by means of gear 49. The output of said tachometer generator 48 is fed back to servo-amplifier 44 where it is used to maintain the speed of motor 45 as determined by the ship's speed voltage obtained from potentiometer 29. A distance counter 50 is mechanically coupled to gear 51 which, in turn, is coupled to gear train 46. In order to obtain distance output orders, a Selsyn generator 52 is also mechanically coupled to gear train 46 through gear 53. It will be observed that gear train 46 will be continuously turning at a rate depending on the ship's speed.

This completes the description of the embodiment of the invention illustrated herein. However, many modifications and advantages thereof will be apparent to persons skilled in the art without departing from the spirit and scope of this invention. Accordingly, it is desired that this invention not be limited to the particular details of the embodiment disclosed herein except as defined by the appended claims.

What is claimed is:

1. A velocity determining system comprising a transmitter for transmitting wave energy into a medium, a variable oscillator coupled to said transmitter, a first frequency control coupled to said oscillator for controlling the frequency thereof, means for receiving reflections of transmitted wave energy, a receiver having a local oscillator, said receiving means being coupled to said receiver, a second frequency control coupled to said local oscillator for controlling the frequency thereof, comparator means coupled to said variable oscillator and said receiver for comparing the frequency of said oscillator with received signals to derive a control voltage, apparatus coupled to said comparator means and said first frequency control and responsive to said control signal to adjust the frequency of said variable oscillator to cause the frequency of transmitted wave energy in said medium to be constant, a speed indicator coupled to said apparatus, a sweep generator, and switch means actuated upon loss of received signals for coupling said sweep generator to said first and second frequency controls.

2. A velocity determining system comprising a transmitter for transmitting wave energy into a medium, a variable oscillator coupled to said transmitter, a first reactance modulator coupled to said variable oscillator for controlling its frequency, means for receiving reflections of transmitted wave energy, a superheterodyne receiver coupled to said receiving means, a second reactance modulator coupled to the local oscillator of said receiver for tuning said receiver, comparator means coupled to said variable oscillator and said receiver for comparing the frequency of said oscillator with received signals to derive a control voltage, apparatus coupled to said comparator means and said first reactance modulator and responsive to said control signal to adjust the frequency of said oscillator to cause the frequency of transmitted wave energy in said medium to be constant, a speed indicator connected to said apparatus, a sweep generator, a switch, and means associated with said switch and responsive to the output of said receiver for actuating said switch upon loss of received signals to couple said sweep generator to said first and second reactance modulators.

3. A velocity determining system for use on a vehicle, comprising a transducer for transmitting wave energy into a liquid through which the vehicle moves, a driver oscillator coupled to said transducer, a first reactance modulator coupled to said driver oscillator for controlling the frequency thereof, means for receiving reflections of transmitted wave energy, a superheterodyne receiver coupled to said receiving means, a second reactance modulator coupled to the local oscillator of said receiver for tuning said receiver, a mixer coupled to said driver oscillator and said receiver for deriving a control signal, a low-pass filter connected to the output of said mixer for passing said control signal, apparatus coupled to said filter and said first reactance modulator and responsive to said control signal to adjust the frequency of said driver oscillator to cause the frequency of transmitted wave energy in said medium to be constant, a speed indicator connected to said apparatus, a sweep generator, a switch actuated upon loss of received signals for coupling said sweep generator to said first and second reactance modulators, a discriminator coupled to the output of said receiver for producing a signal upon receipt of received signals, and means connecting said discriminator to said sweep generator to cause the output of said discriminator to oppose the output of said sweep generator.

4. An acoustic log system for use aboard ship comprising a transducer for transmitting wave energy into a liquid through which the ship moves, a driver oscillator coupled to said transducer, a first reactance modulator coupled to said driver oscillator for controlling the frequency thereof, a transducer for receiving reflected wave energy, a superheterodyne receiver coupled to said receiving transducer, a second reactance modulator coupled to the local oscillator of said receiver for causing said receiver to track received signals, a mixer coupled to said receiver and said driver oscillator for deriving a difference frequency signal, a frequency meter coupled to said mixer for producing a voltage proportional to said difference frequency signal, apparatus coupled to said frequency meter for selecting a control voltage from a potentiometer in response to the output of said frequency meter, a switch connected between said potentiometer and said first and second reactance modulators whereby said control voltage is impressed on said modulators, a sweep generator, means coupled to the output of said mixer for causing said switch to couple said sweep generator to said modulators in the absence of received signals, a discriminator coupled to the output of said receiver, and means connecting said discriminator and said sweep generator to cause the output of said discriminator to oppose the output of said sweep generator.

References Cited in the file of this patent
UNITED STATES PATENTS

| | | |
|---|---|---|
| 2,537,593 | Landon | Jan. 9, 1951 |
| 2,726,383 | Dunn | Dec. 6, 1955 |
| 2,770,795 | Peterson | Nov. 13, 1956 |

UNITED STATES PATENT OFFICE
CERTIFICATE OF CORRECTION

Patent No. 2,908,888                                     October 13, 1959

Robert E. Kirkland

It is hereby certified that error appears in the printed specification of the above numbered patent requiring correction and that the said Letters Patent should read as corrected below.

Column 3, line 37, for "10" read -- 700 --; column 4, line 66, strike out "and"; line 68, for "canstants" read -- constants --; column 6, line 16, for "receiver." read -- receiver, --.

Signed and sealed this 19th day of April 1960.

(SEAL)
Attest:

KARL H. AXLINE
Attesting Officer

ROBERT C. WATSON
Commissioner of Patents